United States Patent [19]
Simpson et al.

[11] Patent Number: 5,654,064
[45] Date of Patent: Aug. 5, 1997

[54] CLAY LINER FOR STEEP SLOPES

[75] Inventors: William J. Simpson, Arlington Heights; Martin J. Simpson, Chicago, both of Ill.

[73] Assignee: Claymax Corporation, Chicago, Ill.

[21] Appl. No.: 658,222

[22] Filed: Jun. 4, 1996

Related U.S. Application Data

[62] Division of Ser. No. 207,008, Mar. 7, 1994, Pat. No. 5,564,864, which is a continuation of Ser. No. 899,575, Jun. 18, 1992, abandoned, which is a continuation of Ser. No. 626,077, Dec. 11, 1990, abandoned.

[51] Int. Cl.$^6$ .............. B32B 3/02; B32B 3/06; B32B 5/16
[52] U.S. Cl. .............. 428/86; 428/87; 428/88; 428/102; 442/240; 442/256
[58] Field of Search .............. 428/86, 87, 88, 428/102, 240, 241

[56] References Cited

U.S. PATENT DOCUMENTS

| | | | |
|---|---|---|---|
| 0,741,679 | 10/1903 | Kubbernuss | 428/454 |
| 2,266,636 | 12/1941 | Hauser . | |
| 4,048,373 | 9/1977 | Clem | 428/454 |
| 4,344,722 | 8/1982 | Blais | 405/270 |
| 4,501,788 | 2/1985 | Clem | 428/240 |
| 4,565,468 | 1/1986 | Crawford | 405/270 |
| 4,950,105 | 8/1990 | Meess et al. | 405/125 |
| 5,041,330 | 8/1991 | Heerten et al. | 428/213 |
| 5,112,665 | 5/1992 | Alexander | 428/102 |
| 5,174,231 | 12/1992 | White | 112/420 |
| 5,221,568 | 6/1993 | Heerten et al. | 428/234 |
| 5,237,945 | 8/1993 | White . | |
| 5,436,050 | 7/1995 | Carriker et al. . | |

FOREIGN PATENT DOCUMENTS

| | | |
|---|---|---|
| 0 071 210 | 7/1981 | European Pat. Off. . |
| 0 087 996 | 2/1982 | European Pat. Off. . |
| 0 071 213 | 7/1982 | European Pat. Off. . |
| 0 278 419 | 8/1988 | European Pat. Off. . |
| 0 362 193 | 12/1992 | European Pat. Off. . |
| 2 327 618 | 5/1873 | Germany . |
| 2 344 835 | 9/1973 | Germany . |
| 34 35 983 A1 | 10/1984 | Germany . |
| 37 00 645 A1 | 1/1987 | Germany . |
| 49-48206 | 12/1974 | Japan . |
| 62-44940 | 3/1987 | Japan . |
| 3-20348 | 5/1991 | Japan . |
| 1 319 603 | 5/1969 | United Kingdom . |
| 1 403 944 | 4/1973 | United Kingdom . |
| 2 123 452 | 5/1982 | United Kingdom . |

OTHER PUBLICATIONS

Opposition to corresponding European Patent 0 490 529 (91 310 984.9) filed by Naue Fasertechnik GmbH & Co. KG on 13 May 1996 (German language—English translation attached).

Opposition to corresponding European Patent 0 490 529 (91 310 984.9) filed by Huesker Synthetic GmbH & Co. on 15 May 1996 (German language—English translation attached).

Opposition to corresonding European Patent 0 490 529 (91 310 984.9) filed by Paul Schreck on 17 May 1996 (German language—English translation attached).

(List continued on next page.)

*Primary Examiner*—Terrel Morris
*Attorney, Agent, or Firm*—Marshall, O'Toole, Gerstein, Murray & Borun

[57] ABSTRACT

A flexible clay liner in roll form for use on steep slopes. The liner includes a layer of geotextiles. The geotextiles are stitched together in rows of stitches which extend along the length of the liner. The thread used to make the stitching is a multifilament thread treated with a resin to prevent wicking through the liner. The spacing of the rows of stitches and the frequency of stitches along the rows are sufficient to transfer shear stresses through the bentonite layers, thus preventing the bentonite from becoming a shear plane.

7 Claims, 2 Drawing Sheets

OTHER PUBLICATIONS

Official Letter from European Patent Office dated Jun. 19, 1996 giving Patentee until Oct. 19, 1996 within which to file observations on the three oppositions which have been filed against European Patent 0 490 529. The official letter refers to enclosures with the words "Documents Opposition 01". These documents comprise a Decision in German of the Technical Board of Appeal 3.2.3 of 7th Feb. 1996, an English translation of that Decision, an Opinion (Gutachten) of Jan. 25, 1994 issued by the Institut für Textiltechnik of Aachen, and a Report dated Feb. 27, 1990 issued by the Franzius–Institut der Universität Hannover. These documents have obviously been filed by the first Opponents to supplement and to give evidence for the contentions made in their Opposition statement.

Official Letter from European Patent Office dated Jul. 22, 1996, and a copy of its enclosure, in which it is confirmed that the Opposition of Paul Schreck was in fact filed within the Opposition term.

Response (observations) to three oppositions identified as C1–C3 filed by Patentee with the European Patent Office on 3 Oct. 1996.

Opposition filed in Counterpart to corresponding Japanese Patent Application No. 3–350021 by Masahiko Onoyama, a Japanese national in 1995 with English translation of "Summary of Reasons for Opposition" together with copy of a letter in English dated Sep. 29, 1995 regarding said Japanese opposition and C8–C10 identified below.

"The Foundation Engineering & Equipment", vol. 18, No. 11, Nov., 1990, pp. 101–103.

"The Doboku Seko", vol. 24, No. 5, Apr. 1983, pp. 40–42. (A trade journal article which purportedly applies the invention of B15 to steep slopes. Attached to the exhibit as Reference 2 is a secion of a catalog describing the invention of B15 as being concrete sandwiched between two nylone sheets. Also attached is a printout showing the details of the registration of the patent application in B15, which patent is cited in C9 and attached Reference 2).

Haliburton, et al., Article in a Japanese trade journal (May 20, 1962) disclosing that the material used in the "geotextiles" which formt he base sheets of the invention is commonly composed of a polyamide–containing material such as polypropylene, polyester, or nylon.

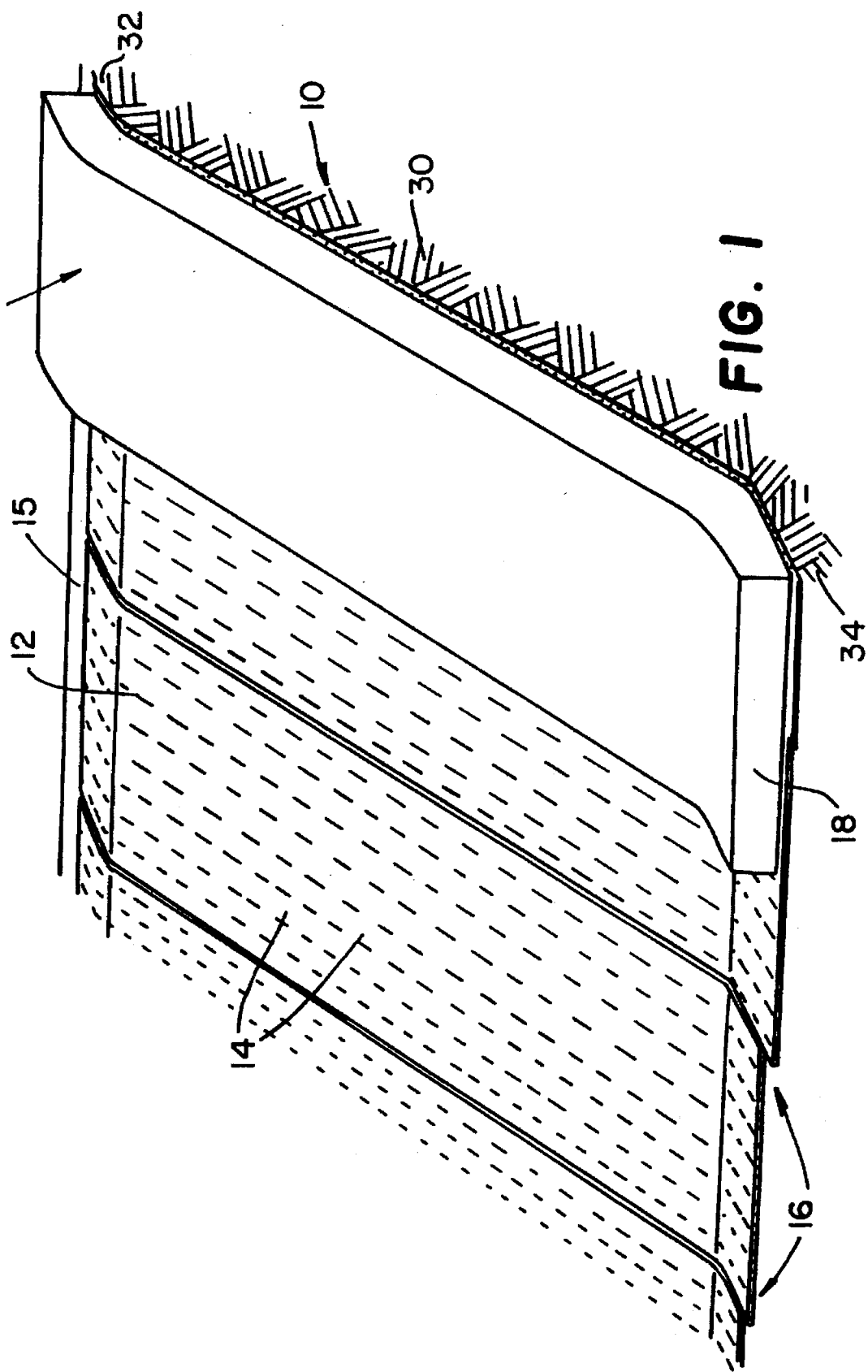

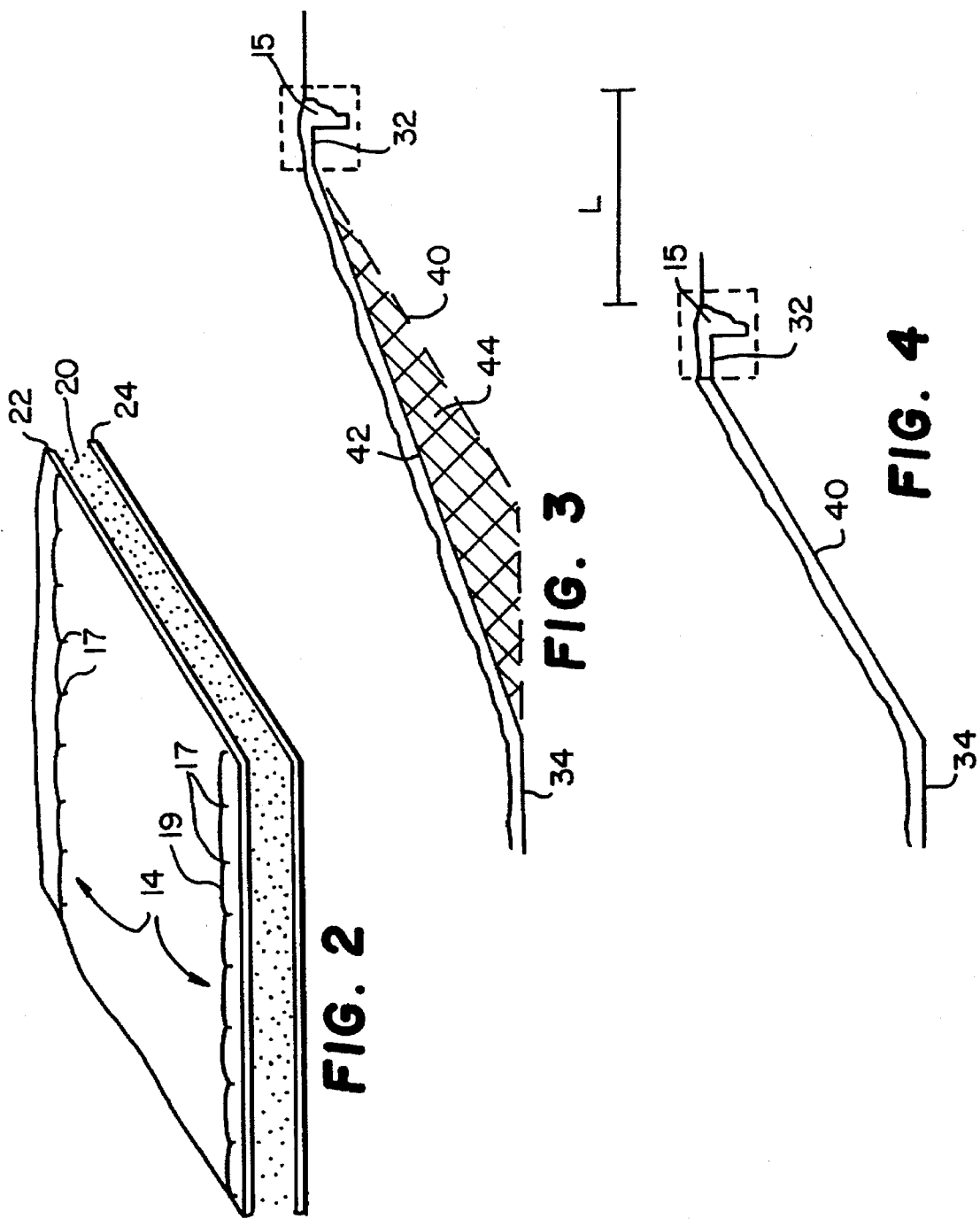

CLAY LINER FOR STEEP SLOPES

This is a divisional of U.S. application Ser. No. 08/207,008, filed Mar. 7, 1994 now U.S. Pat. No. 5,564,864 which is a continuation of U.S. application Ser. No. 07/899,575 filed Jun. 18, 1992, abandoned, which is a continuation of U.S. application Ser. No. 07/626,077 filed Dec. 11, 1990, abandoned.

BACKGROUND AND SUMMARY OF THE INVENTION

The present invention relates to liners which are used to form an impermeable barrier. In particular, the invention relates to an improved liner which is capable of being used on steep slopes. Liners for which the present invention has particular application are those which incorporate a layer of swellable clay, such as bentonite.

The present invention is in the nature of an improvement to liners like the one shown in U.S. Pat. No. 4,501,788, in which a layer of granular bentonite is enclosed between two flexible sheets. In such liners, a water-soluble adhesive is used to attach the bentonite particles to a geotextile. The geotextile used will depend upon the application, but are preferably comprised of at least one woven polypropylene geotextile. Other fabrics include non-woven fleece-like geotextiles and lightweight polyester net-like scrims.

Bentonite clay upon hydration tends to expand and become a highly impervious material. However, like most other clays, exposure of bentonite to water causes it to become very slick, greatly reducing the ability of the clay to withstand shear stresses. As a result, use of clay liners on slopes must be restricted to those having relatively shallow angles.

Some manufacturers of clay liners have attempted to create shear resistance in clay liners by needlepunching connections between fabric layers through the bentonite layer. However, these systems have two distinct disadvantages. First, the strength of the connection formed by needlepunching fibers is low. In some cases, the expansion force of the hydrated bentonite is sufficient to break the needlepunched connections. Second, needlepunched fibers form a path for capillary migration of water through the bentonite layer.

Manufacturers of needlepunched liners have attempted to rely upon needlepunched connections to retain the bentonite between the fabric layers in an effort to avoid the use of adhesive bonding of the bentonite to a fabric layer. Such heavy reliance upon the needlepunched connections for both bentonite retention and shear resistance has resulted in problems with both delivery and performance of such products. Needlepunching is generally inadequate as a sole means for retaining bentonite between two layers of fabric. The bentonite tends to migrate laterally unless it is held in place by means such as adhesive bonding. The integrity of the needlepunched connections is further compromised by the flexible nature of bentonite liners. It is an important feature of such liners that they be capable of being rolled up into a carpet-like form, so that installation can take place in an expedited manner. The stresses introduced to connections between fabric layers as a result of the rolling up of the liner during the manufacturing process, results in significant stresses upon the interfabric connections. After a needlepunched liner has been rolled and unrolled, the needlepunched connections may not have sufficient strength to resist the expansion of the bentonite layer, or to withstand shear stress on a slope.

Bentonite-based liners have found significant acceptance for use in preventing groundwater contamination. Bentonite liners have been used successfully in hazardous waste and municipal solid waste landfills. An important consideration in the construction of such landfills is the slope angle of the excavation. For a given area, significantly greater landfill volume can be achieved by the use of steeper slopes. The use of steep slopes allows more efficient use of a particular landfill site.

Similarly, clay liners are often used in tank farm applications in which berms or excavations are formed with sloping sides. Steeper slopes in tank farm applications allow more efficient use of real estate.

Accordingly, it is an object of the present invention to provide an improved bentonite liner which may be used to form an impervious barrier along a relatively steep slope.

Another object of the present invention is to provide a bentonite liner which does not allow for the migration of liquid through the liner.

It is a further object of the present invention to provide a liner which has significantly improved resistance to shear stresses.

These and other objects and advantages of the invention are achieved with a liner which is comprised of a layer of bentonite granules adhered to a woven polypropylene geotextile. A second woven polypropylene geotextile is placed on or adhered to the bentonite layer to form a sandwich like construction comprised of two geotextiles with a layer of bentonite therebetween. Rows of stitches are used to connect the two geotextiles. The stitching is comprised of a polymeric thread, preferably a coated multifilament thread comprised of high density polyethylene filaments. The thread is applied to the liner in a two-thread chainstitch at a rate of approximately three stitches per inch. The lateral spacing of the rows will depend upon the degree of shear resistance required by a particular application. However, it is preferable that the rows be spaced approximately two inches apart. The rows should extend along the length of the liner, rather than in the direction of the width of the liner.

The objects and advantages of the invention will become more apparent upon a reading of the following specification, read in conjunction with the accompanying drawings:

BRIEF DESCRIPTION OF THE DRAWINGS

FIG. 1 is a perspective view of a slope to which the liner of the present invention has been applied.

FIG. 2 is an enlarged perspective view of a portion of the liner of the present invention.

FIGS. 3 and 4 are sectional views showing the advantage of using a liner of the present invention.

DETAILED DESCRIPTION OF THE DRAWINGS

FIG. 1 is a perspective view which shows a prepared subgrade 10 with a sloping central portion 30 and flat upper and lower portions 32 and 34. The slope shown in FIG. 1 is typical of those which are used in both landfill and tank farm applications. Liners 12 are applied to the sloping prepared subgrade 10, with overlapping seams 16. Rows 14 of stitching are shown schematically as dotted lines in FIG. 1. The spacing of the rows 14 is discussed in more detail later. The upper ends of the liners 12 are placed in a trench 15, and cover soil 18 is applied on top of the overlapping liners 12. FIG. 2 is an enlarged view showing in greater detail the construction of the liner 12 of the present invention. The liner is comprised of an upper geotextile 22, and a lower geotextile 24, preferably made of a woven, non-biodegradable propylene. The stitches 17 are at a frequency of approximately 3 stitches per inch, and the rows 14 are spaced approximately 2 inches apart. As can be seen from FIG. 1, the rows 14 extend along the length of the liners 12. The parallel rows 14 of stitching extend along the length of the liner and transfer shearing forces from one geotextile to the other through the bentonite layer. The thread 19 which is used to form the stitches 17 is preferably a multifilament high density polyethylene thread. Multifilament threads are generally stronger than monofilament threads. However, multifilament threads should be coated to prevent wicking or capillary action of water and other liquids through the liners 12. The treatment of the thread used to make the stitches 17 may be the application of a polymer resin, such as nylon or polypropylene resin. While high density polyethylene thread will be resistant to most leachates, other thread materials may be required for particular waste containment applications. It is preferred that a two-thread chainstitch be used to ensure an effective interconnection between the geotextiles, although other kinds of stitches, such as a single-thread chainstitch, may be used.

While the geotextiles 22 and 24 shown on opposite sides of the bentonite layer 20 in FIG. 2 are preferably woven polypropylene, liners of the present invention may be constructed of other geotextiles, such as nonwoven fabrics. The clay layer 20 is preferably bonded to at least one, and perhaps both, of the geotextiles by a water based, water soluble adhesive. It is important that the geotextiles be flexible so that the liner 12 may be rolled up. In the rolled up form, the rows 14 of stitches will assume a spiral configuration around the axis of the roll. When unrolled, the rows 14 will extend up and down the sloped subgrade 10. With the rows 14 of stitching extending up and down the slope, shear stresses from the cover soil 18 are better transferred between the geotextiles 22 and 24 through the bentonite layer 20.

FIGS. 3 and 4 show more clearly the advantages of the present invention. The dotted line 40 in FIG. 3 shows the outline of a liner applied at a steeper slope than the one along line 42. The hatched area 44 shows the increases available volume resulting from the use of a liner of the present invention. Because of the slick nature of bentonite after it is hydrated, slopes employing bentonite liners have generally been restricted to those with a 4:1 slope. A liner applied along the line 42 in FIG. 3 is shown with a slope of approximately 4:1.

FIG. 4 shows the advantage of using a steeper slope in tank farm applications. By using a slope of about 1.2:1, as shown in FIG. 4, the radius of the excavation can be reduced by the length L. As a result, storage tanks can be spaced closer together, resulting in more efficient use of land area. The increased volume available for fill in landfill applications and the more efficient use of land area in tank farm applications can be achieved with a liner of the present invention without sacrificing the desirable aspects afforded by the use of bentonite liners.

It will be recognized by those skilled in the art that considerations such as the depth and angle of repose of the soil used as cover, and other factors, will determine the extent to which an excavation or berm can be sloped. By using the stitched liner of the present invention, geotechnical engineers can make greater use of land designated for landfills and tank farms. With the liner of the present invention, greater volumes of cover may be used as compared with liners of the prior art. The use of more cover on a slope means that it can better resist the process of erosion.

While a specific embodiment of the invention has been shown and described, it will be apparent to those skilled in the an that numerous alternatives, modifications, and variations of the embodiment shown can be made without departing from the spirit and scope of the appended claims.

I claim:

1. A liner for use in containing liquid, said liner comprising two non-biodegradable geotextiles, a layer of water-swellable clay between said two geotextiles, and stitching means, for interconnecting said two geotextiles, extending through said clay layer and connecting said geotextiles, wherein said layer of water-swellable clay is bonded to at least one of said geotextiles independent of said stitching means.

2. A liner in accordance with claim 1 wherein:
    said two geotextiles are flexible porous fabrics.

3. A liner in accordance with claim 2 wherein:
    at least one of said two geotextiles is a woven polypropylene geotextile.

4. A liner in accordance with claim 3 wherein:
    said two geotextiles are both woven polypropylene geotextiles.

5. A liner in accordance with claim 1 wherein:
    said stitching means comprise generally parallel rows of stitches.

6. A liner in accordance with claim 1 wherein:
    said layer of clay is connected to at least one of said geotextiles by an adhesive.

7. A liner in accordance with claim 6 wherein:
    said adhesive is water-based and water-soluble.

* * * * *